US006259731B1

(12) United States Patent
Dent et al.

(10) Patent No.: US 6,259,731 B1
(45) Date of Patent: Jul. 10, 2001

(54) SYSTEM AND METHOD FOR RADIO-COMMUNICATION USING FREQUENCY MODULATED SIGNALS

(75) Inventors: Paul W. Dent, Pittsboro; John J. Hayes, Jr., Wake Forest, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/115,276

(22) Filed: Jul. 14, 1998

(51) Int. Cl.[7] ....................................................... H03K 7/06

(52) U.S. Cl. .......................... 375/239; 375/302; 332/119; 370/529

(58) Field of Search .................................... 375/238, 239, 375/303, 334; 455/102, 205; 332/117, 119; 370/442, 527, 529; 485/23, 42

(56) References Cited

U.S. PATENT DOCUMENTS 3,623,105 * 11/1971 Kamen ................................ 455/102
4,225,866 * 9/1980 Levien ................................ 342/173
4,328,579 * 5/1982 Hashimoto et al. ................. 370/210
4,551,771 * 11/1985 Machida et al. ....................... 386/39
5,870,675 * 2/1999 Tuutijarvi et al. ................... 455/436

* cited by examiner

*Primary Examiner*—Stephen Chin
*Assistant Examiner*—Chieh M. Fan
(74) *Attorney, Agent, or Firm*—Wood, Phillips, VanSanten, Clark & Mortimer

(57) ABSTRACT

A method has the steps of generating a first control message having a plurality of message symbols and a first audio message to be transmitted from a first radio-communications device to a second radio-communications device. The first audio message is sampled to obtain a first plurality of audio samples, each with an instantaneous signal valve, and a first radio frequency signal which varies in frequency from a first predetermined radio frequency dependent on the instantaneous signal valves of the first plurality of samples is generated. The first radio frequency signal is formatted into a first pulsed radio frequency signal, each pulse having a time duration representative of one of the plurality of message symbols of the first control message, which is transmitted from the first radio-communication device to the second radio-communication device. A system is also provide wherein first and second radio-communication devices each include a radio frequency antenna, a frequency modulator to generate a first radio frequency signal which varies from a first predetermined radio frequency dependent on the instantaneous signal values of an audio signal provided thereto, and a first switch coupled to the antenna and the modulator to selectively couple the antenna to the modulator for a first predetermined duration, the duration of the coupling of the antenna to the modulator representative of a symbol of a control message to be communicated between the first and second radio-communication devices.

18 Claims, 9 Drawing Sheets

| Fig. 2Aa | Fig. 2Ab |
| --- | --- |

| Fig. 2Ba | Fig. 2Bb |
|---|---|

SCAN CHANNELS
138
CHANNEL AVAILABLE ?
140
NO
YES
SET BROADCAST CHANNEL
142
SCAN OTHER CHANNELS
144
CHANNEL AVAILABLE ?
146
NO
YES
SET ALTERNATE CHANNEL
148
SEND CONTROL MESSAGE
150
VALID RESPONSE ?
152
YES
NO
LOCK CONFIRMED
154
LOCK NOT CONFIRMED
156
BROADCAST CHANNEL CLEAR ?
158
NO
YES
ALTERNATE CHANNEL CLEAR ?
160
NO
YES
TIME DELAY
162

164
INITIALIZATION
166
TUNE TO LOWEST CHANNEL
170
RECEIVE VALID CONTROL MESSAGE ?
NO
TUNE TO NEXT HIGHEST CHANNEL
168
YES
172
LOCK CONFIRMED
174
STORE ALTERNATE CHANNEL NUMBER
176
SEND RESPONSE MESSAGE
182
ALTERNATE CHANNEL SELECTED ?
YES
173
LOCK NOT CONFIRMED
NO
184
TUNE TO ALTERNATE CHANNEL
180
RECEIVE VALID CONTROL MESSAGE ?
YES
NO
186
LOCK NOT CONFIRMED ?
YES
NO

SYSTEM AND METHOD FOR RADIO-COMMUNICATION USING FREQUENCY MODULATED SIGNALS

FIELD OF THE INVENTION

The present invention is directed to a system and method for radio-communication, and in particular, to a system and method for raido-communication using frequency modulated signals.

BACKGROUND OF THE INVENTION

Over the last several years, radio-communication technology, and in particular cellular phone technology, has become a fixture in the everyday lives of many Americans. No longer tied to the fixed public switched telephone network, people have grown accustomed to the great flexibility and freedom that this "wireless" technology allows.

However, there still remains the annoying necessity of holding the cellular phone unit in place during use. As a consequence, the user either has to keep at least one hand holding the unit or has to crook his or her neck in an attempt to support the unit between the ear and the shoulder. As cellular phones become smaller and smaller, the later option becomes less and less viable.

To eliminate this problem, it has been suggested that cellular phones be equipped with circuitry to allow the phone to be used in combination with a headset which the cellular phone user can wear. Having one or more headphones and a microphone, as well as a series of control switches to turn the headset on and off, these headset/phone systems offer a tantalizing "hands free" alternative to those cellular phone users who seem to have their cellular phones "glued" to their ears.

To offer such an alternative, the headset/phone system must be able to establish a communications link between the headset and the phone. The link must support full duplex transmission of control information and audio information, with the control information preferably in digital form and the audio information presently preferably in analog form.

At the present time, at least one headset/phone system has been developed which provides duplex transmission of control and audio information. The system employs bursts or pulses of an RF carrier to convey control and audio information. Specifically, the time between pulses is used to convey both the control and audio information.

This system has a number of drawbacks. The signal to noise ratio may be poor, because of a narrow range of timing values employed between pulses. Moreover, all headset/phone pairs of this system operate on the same frequency, the manufacturer having attempted to use time shifting to separate the pulse streams of different headset/phone pairs. As a consequence, if two or more headset/mobile phone pairs of this system are used in close proximity over a prolonged period of time, problems may eventually occur as the time bases of different units "drift" into an interference condition.

SUMMARY OF THE INVENTION

According to an aspect of the present invention, a method of communicating control and audio information between at least two radio-communication devices is provided. The method has the steps of generating a first control message having a plurality of message symbols to be transmitted from a first radio-communications device to a second radio-communications device, and generating a first audio message to be transmitted from the first radio-communications device to the second radio-communications device. The first audio message is sampled to obtain a first plurality of audio samples, each with an instantaneous signal value, and a first radio frequency signal which varies in frequency from a first predetermined radio frequency dependent on the instantaneous signal values of the first plurality of samples is generated. The first radio frequency signal is formatted into a first pulsed radio frequency signal, each pulse having a time duration representative of one of the plurality of message symbols of the first control message, which is transmitted from the first radio-communication device to the second radio-communication device.

The step of generating a first audio message may include the step of receiving the first audio message from a cellular base station.

The first pulsed radio frequency signal may be received at the second radio-communication device, and the time duration of each pulse of the first pulsed radio frequency signal and the variation in frequency of each pulse of the first pulsed radio-frequency signal from the first predetermined radio frequency may be determined. The first control message may then be regenerated from the determined time durations, and the first audio message may be regenerated from the determined frequency variations.

The method may also include the step of transmitting the regenerated first audio message from the second radio-communications device to a cellular base station.

The method may also include the step of driving a speaker using the regenerated first audio signal.

Where the first pulsed radio frequency signal has a predetermined time between pulses, the method may include the steps of generating a second control message including a plurality of message symbols to be transmitted from the second radio-communications device to the first radio-communications device, and generating a second audio message to be transmitted from the second radio-communications device to the first radio-communications device. The second audio message is sampled to obtain a second plurality of audio samples, each with an instantaneous signal value. A second radio frequency signal is generated which varies in frequency from the first predetermined radio frequency dependent on the instantaneous signal values of the second plurality of audio samples. The second radio frequency signal is formatted into a second pulsed radio frequency signal, each pulse having a time duration representative of one of the plurality of message symbols of the second control message. The pulses of the second pulsed radio frequency signal from the second radio-communication device to the first communications device are transmitted during the predetermined time between the pulses of the first pulsed radio frequency signal.

The method may also include the steps of generating a second control message having a plurality of message symbols to be transmitted from a third radio-communications device to a fourth radio-communications device. A second audio message may also be generated to be transmitted from the third radio-communications device to the fourth radio-communications device. The second audio message may be sampled to obtain a second plurality of audio samples, each with an instantaneous signal value. A second radio frequency signal may be generated which varies in frequency from a second predetermined radio frequency dependent on the instantaneous signal values of the second plurality of samples, the second predetermined radio frequency being different from the first predetermined radio frequency. The second radio frequency signal is formatted into a second pulsed radio frequency signal, each pulse having a time duration representative of one of the plurality of message symbols of the second control message, which is transmitted from the third radio-communication device to the fourth communication device.

Also, the method may include tuning in a first radio frequency from a plurality of radio frequencies, and determining the level of noise or interference associated with the first radio frequency. The first radio frequency may be designated as the first predetermined radio frequency if the determined level is below a predetermined threshold level.

Another radio frequency may be tuned in from the plurality of radio frequencies other than the first radio frequency if the level of noise associated with the first radio frequency is above the predetermined threshold level, and the level of noise or interference associated with the other radio frequency may be determined. The other radio frequency may be designated as the first predetermined radio frequency if the determined level associated with the other radio frequency is below the predetermined threshold level.

A second radio frequency may be tuned in from the plurality of radio frequencies other than the first radio frequency, and the level of noise or interference associated with the second radio frequency determined. The second radio frequency may be designated as an alternate predetermined radio frequency if the determined level associated with the second radio frequency is below the predetermined threshold level.

After the step of designating the first predetermined radio frequency, it may be determined that the level of noise or interference associated with the first predetermined radio frequency is above the predetermined threshold level. The alternate predetermined radio frequency may be designated as the first predetermined radio frequency if the determined level associated with the previous first predetermined radio frequency is above the predetermined threshold level.

According to another aspect of the invention, a radio-communication system has first and second radio-communication devices capable of communicating with each other. The first and second radio-communication devices each include a radio frequency antenna, a frequency modulator to generate a first radio frequency signal which varies from a first predetermined radio frequency dependent on the instantaneous signal value of an audio signal provided thereto, and a first switch coupled to the antenna and the modulator to selectively couple the antenna to the modulator for a first predetermined duration, the duration of the coupling of the antenna to the modulator representative of a symbol of a control message to be communicated between the first and second radio-communication devices.

The first and second radio-communication devices may include first and second terminals, and a second switch coupled between the first and second terminals, the switch selectively coupling the first terminal to the second terminal for a second predetermined duration which is longer than the first predetermined duration. The antenna is coupled to the first terminal, and a receiver is coupled to the second terminal for (a) determining the duration of a radio frequency signal selectively coupled to the second terminal, (b) determining the deviation of the frequency of a radio frequency signal selectively coupled to the second terminal relative to the first predetermined radio frequency, (c) regenerating an audio signal dependent on the determined variation in the frequency of a radio frequency signal selectively coupled to the second terminal relative to the first predetermined radio frequency, and (d) regenerating a control signal from the determined radio frequency signal durations.

A microphone may be coupled to the frequency modulator to provide the frequency modulator with an audio signal, and a speaker may be coupled to the receiver to receive therefrom an audio signal.

The second radio-communications device may include cellular circuitry coupled to the frequency modulator for (a) providing the frequency modulator with an audio signal received from a base station, and (b) transmitting the regenerated audio signal received from the receiver to a base station.

The first and second radio-communications devices may be mobile radio-communications devices.

The first radio-communications device may have a speaker coupled to the receiver to receive therefrom an audio signal and a microphone coupled to the frequency modulator to provide the frequency modulator with an audio signal, the speaker and the microphone mounted to a headset securable to a head of a user. The second radio-communications device may be a cellular phone.

The system may also have third and fourth radio-communication devices capable of communicating with each other. The third and fourth radio-communications devices each may include a radio frequency antenna, a frequency modulator to generate a radio frequency signal which varies from a second predetermined radio frequency dependent on the instantaneous signal value of an audio signal provided thereto, the second predetermined radio frequency being different than the first predetermined radio frequency, and a first switch coupled to the antenna and the modulator to selectively couple the antenna to the modulator for a predetermined duration, the duration of the coupling of the antenna to the modulator representative of a symbol of a control message to be communicated between the third and fourth radio-communications devices.

DETAILED DESCRIPTION OF THE PREFERRED EMBODIMENT

Figure 1:
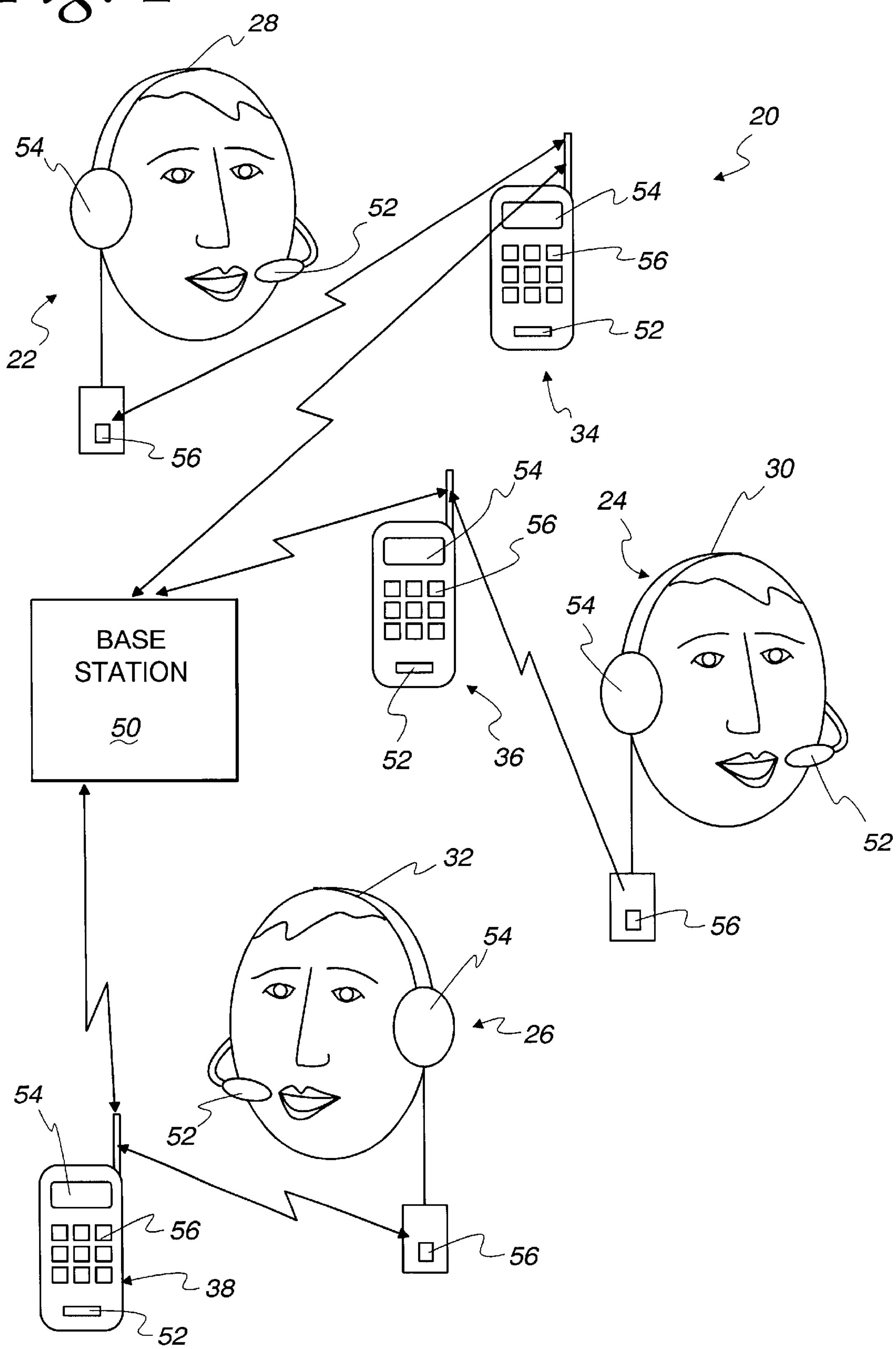
FIG. 1 is a schematic diagram of a system according to the present invention of a plurality of mobile radio-communication devices.

FIGS. 1, 2A, 2B and 3 illustrate the structure and operation of a system 20 including a plurality of mobile radio-communication devices (FIG. 1). Some of the mobile radio-communication devices 22, 24, 26 are configured as headsets, i.e. radio-communication devices which can be worn secured to the head through the use of a headbands 28, 30, 32, for example. Others of the mobile radio-communication devices 34, 36, 38 are configured as cellular phones.

Figure 2A:
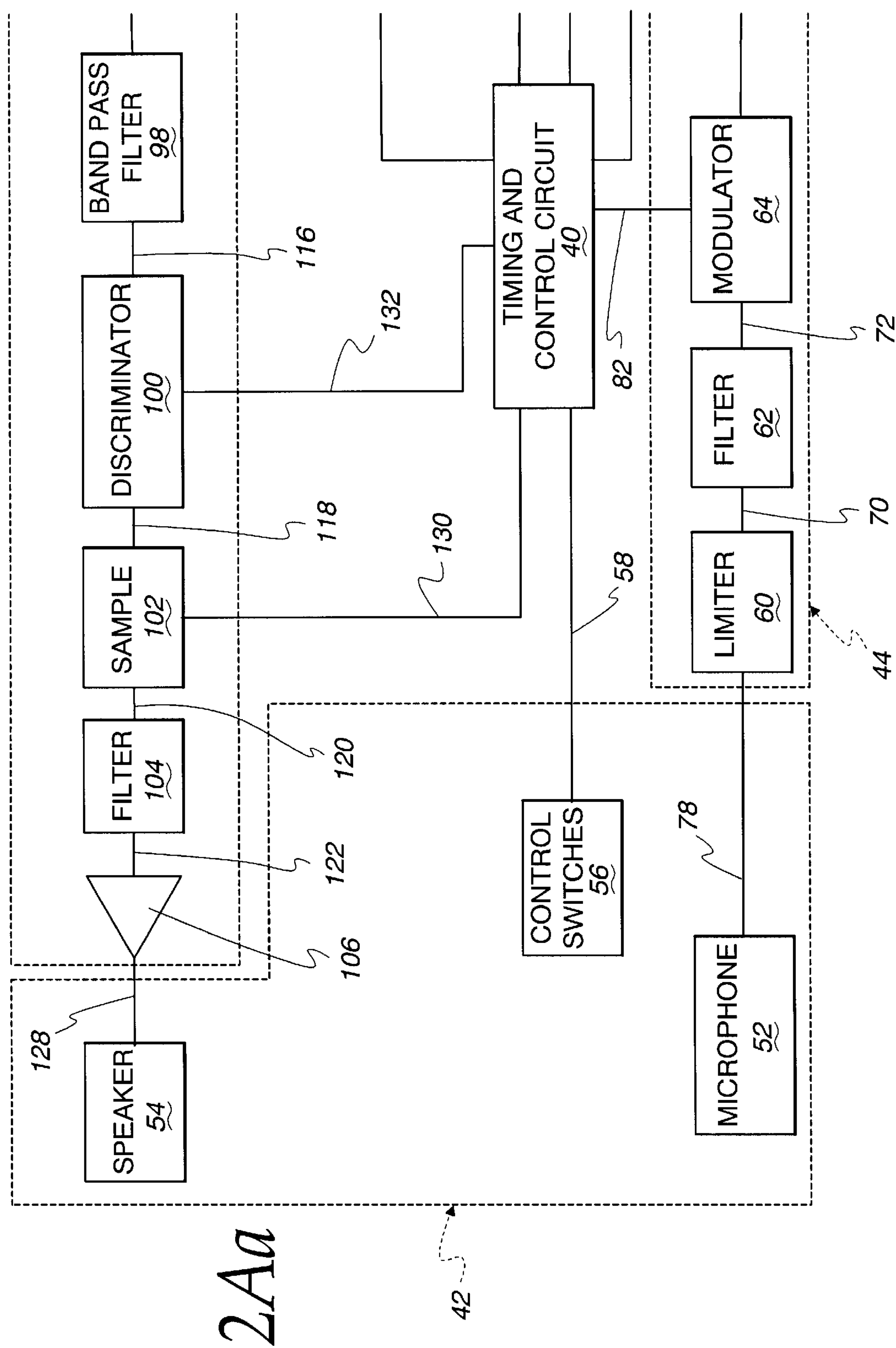
FIG. 2A is a block diagram of the circuitry in each of the radio-communication devices configured for use as a headset as shown in FIG. 1 which enables these radio-communication devices to communicate with each of the radio-communication devices configured for use as a cellular phone using pulsed, frequency modulated signals.
Figure 2A:
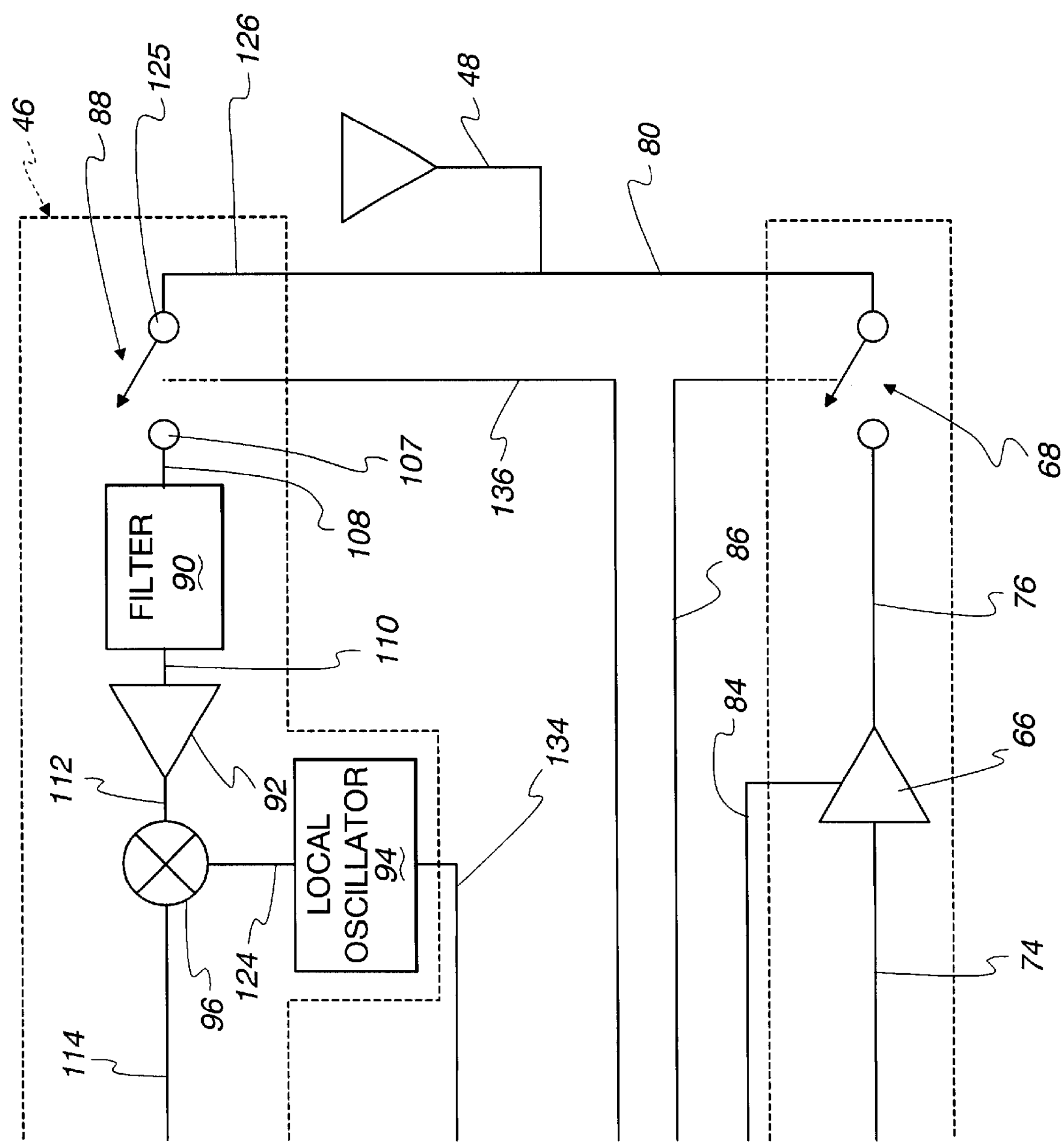
Figure 2B:
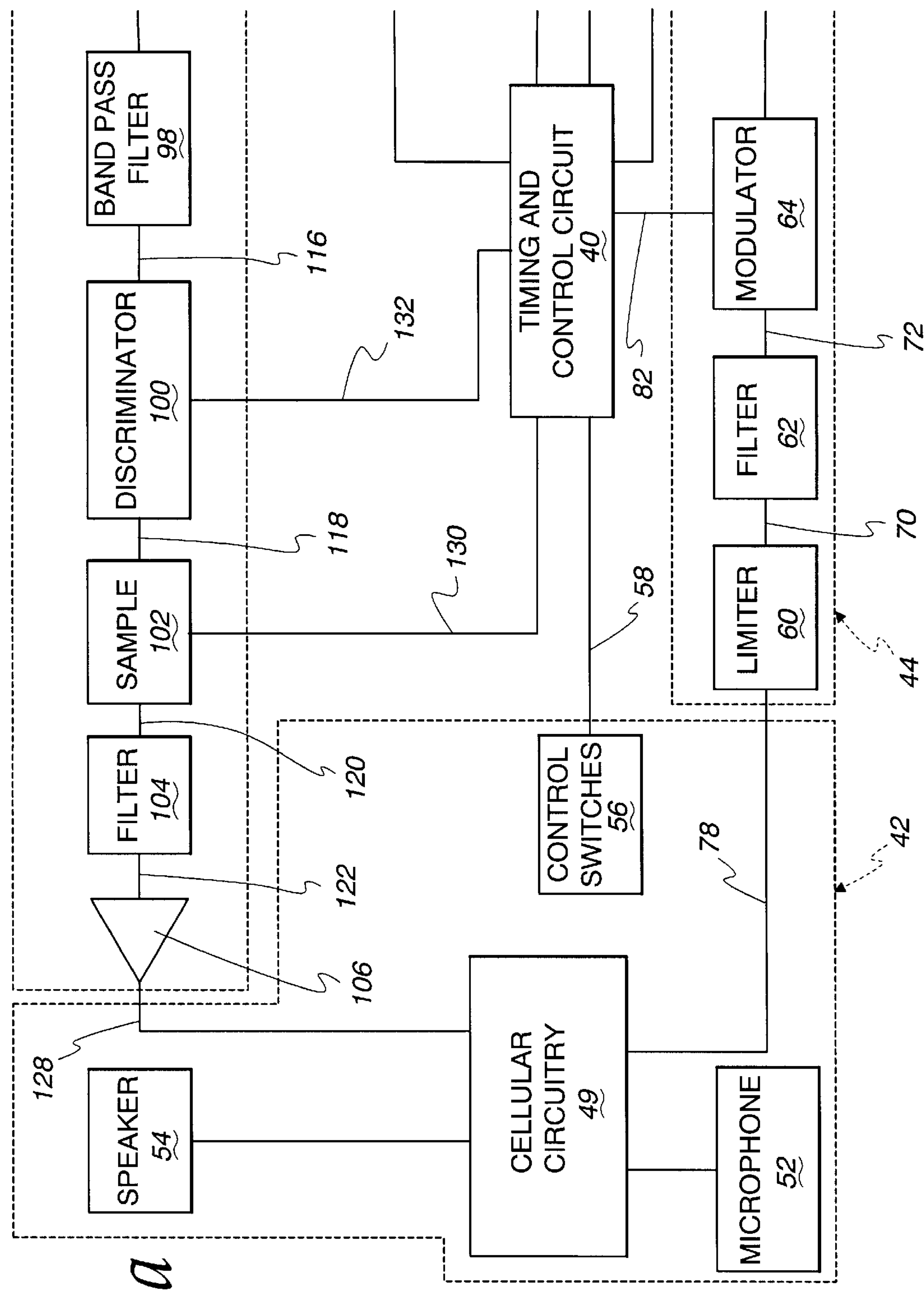
FIG. 2B is a block diagram of the circuitry in each of the radio-communication devices configured for use as cellular phone as shown in FIG. 1 which enables these radio-communication devices to communicate with each of the radio-communication devices configured for use as a headset using pulsed, frequency modulated signals.
Figure 2B:
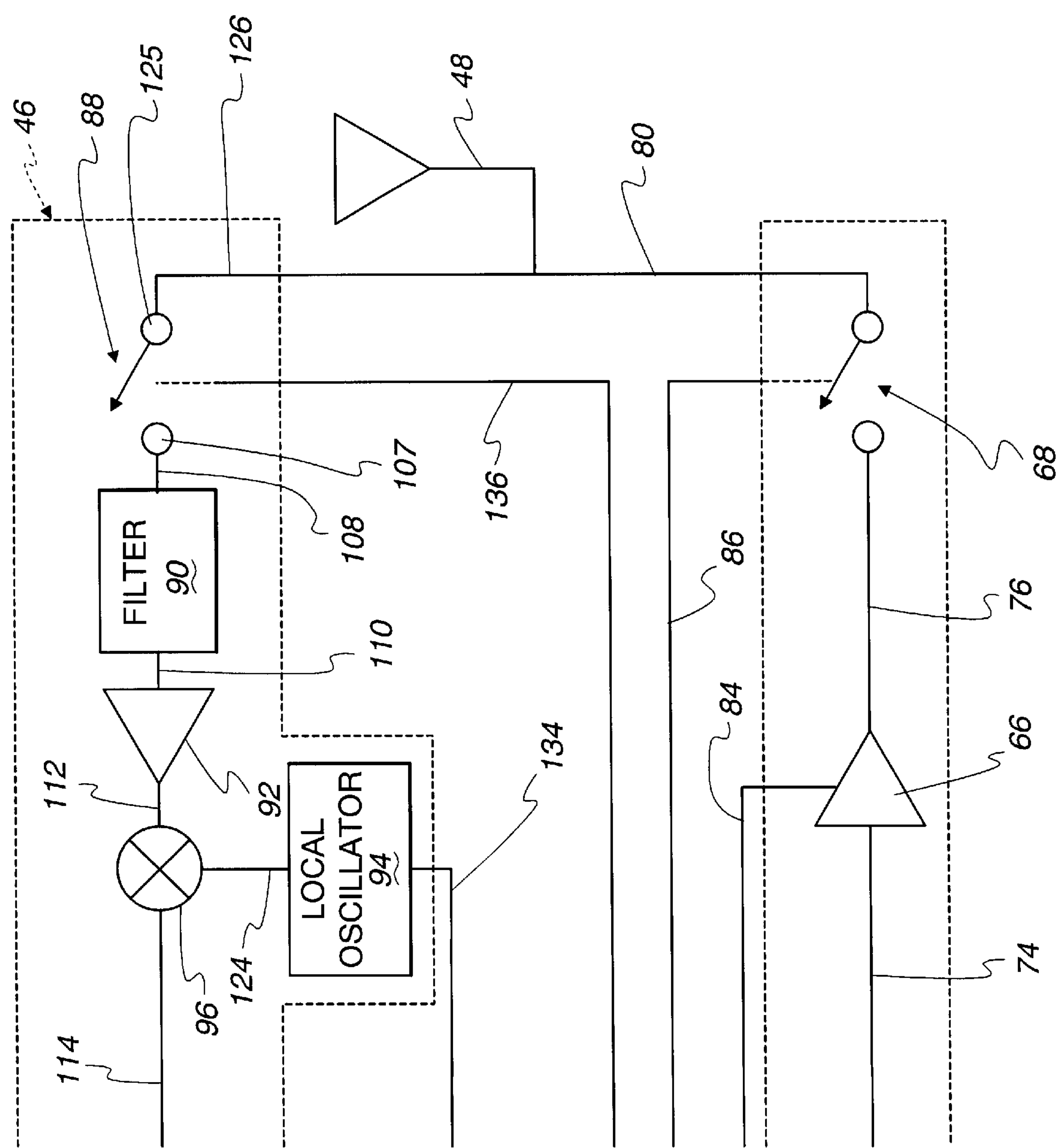

Each of the radio-communication devices 22, 24, 26, 34, 36, 38 includes a control circuit 40, an input/output assembly 42, a transmitter assembly 44, a receiver assembly 46, and a radio-frequency antenna 48 (FIGS. 2A and 2B). As a result, each of the radio-communication devices 22, 24, 26 can transmit messages to, or receive messages from, the radio-communication devices 34, 36, 38, and vice versa. Additionally, the radio-communication devices 34, 36, 38 (FIG. 2B) have additional cellular circuitry 49 (transceiver, microprocessor, memory, antenna, etc.) as part of the input/output assembly 42 so as to be able to communicate with a base station 50 of a cellular radio-communication network.

As will be recognized from FIGS. 2A and 2B, the input/output assembly 42 may include, in addition to the cellular circuitry 49, a microphone 52, a speaker 54, and a set of control switches 56. The control switches 56 provide signals to the control circuit 40 via the connector 58 representative, for example, of the user's desire to turn the device on or off, to answer a call, to redial a number, etc. The cellular circuitry 49, the microphone 52 and the speaker 54 provide the user with the ability to input and receive audio messages between the radio-communications devices 22, 24, 26, 34, 36, 38 and between the radio-communications devices 34, 36, 38 and the base station 50.

In the radio communication devices 22, 24, 26, the microphone 52 is coupled to the transmitter assembly 44, while in the radio-communication devices 34, 36, 38, the cellular circuitry 49 is coupled to the transmitter assembly 44. Consequently, an audio message to be communicated between the radio-communications devices 22, 24, 26 and 34, 36, 38 can be generated by the user speaking into the microphone 52 or can be an audio message received from the base station 50 via the cellular circuitry 49.

The transmitter assembly 44, under the control of the control circuit 40, formats the audio message, however generated, into a pulsed, frequency-modulated radio frequency signal. The frequency of each pulse is varied with reference to a predetermined frequency to convey information concerning the variation in the instantaneous signal value of a sample of the audio message. The time duration of the pulse is varied to convey information relating to the control of the link between the radio-communication devices, for example, the devices 22, 34, this information preferably being in the form of a series of message symbols or bits. This pulsed, modulated signal is provided to the antenna 48 for transmission.

The antenna 48 also receives pulsed, modulated signals from other radio-communication devices, which signals are coupled to the receiver assembly 46. The pulses from other radio-communication devices are received between the transmitted pulses so that the transmitter assembly 44 does not interfere with the receiver assembly 46. The receiver assembly 46 separates each pulse into the information representative of a portion of the audio message and the information representative of a portion of the control message. Specifically, the receiver assembly 46 determines the deviation of the frequency of the pulse from a predetermined frequency to determine the signal value of the portion of the audio message conveyed by the pulse. Moreover, the receiver assembly 46, in conjunction with the control circuit 40, times the duration of the pulse to determine the control information conveyed by the pulse. Over time, the receiver assembly 46 combines the information received to regenerate the complete audio and control messages transmitted by the radio-communication device initiating the communication link.

In the radio-communication devices 22, 24, 26, the regenerated audio message is used to drive the speaker 54, so as to communicate the regenerated audio message to the user. Alternatively, in the radio-communication devices 34, 36, 38 equipped with the cellular circuitry 49, the regenerated audio message can be transmitted to the cellular base station 50, and from there to a public switched telephone network.

Figure 3:
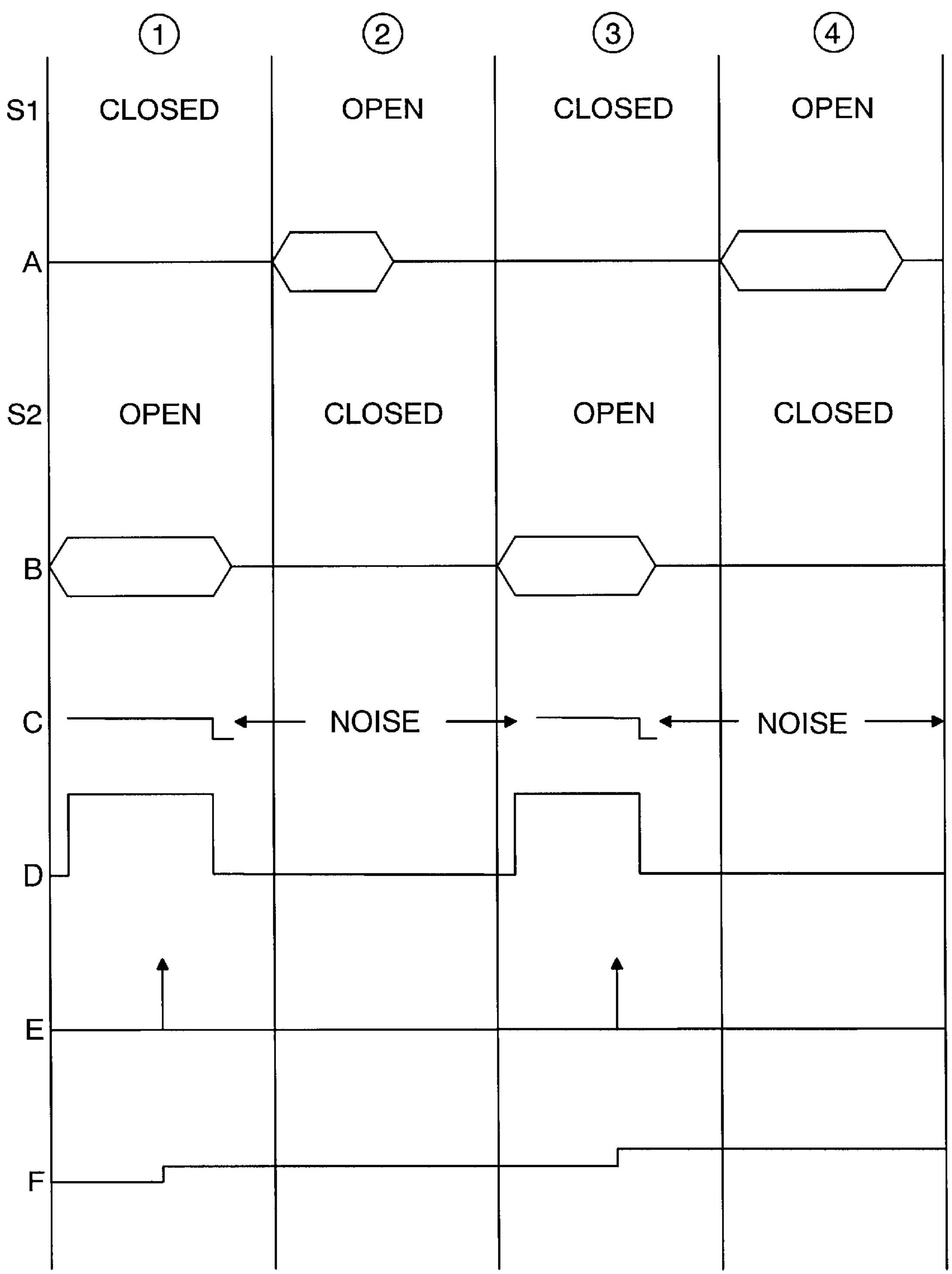
FIG. 3 is a timing diagram showing the operation of one of the pairs of mobile radio-communication devices shown in FIG. 1 during the transmission and receipt of a message formatted as a pulsed, frequency modulated signal.

The structure and operation of the transmitter and receiver assemblies 44, 46 of each of the radio-communication devices 22, 24, 26, 34, 36, 38 are now discussed in greater detail with respect to FIGS. 2A, 2B and 3.

The transmitter assembly 44 includes a limiter 60, a filter 62, a modulator 64, an amplifier 66 and a switch 68. The limiter 60, the filter 62, the modulator 64, the amplifier 66 and the switch 68 are coupled in series by connectors 70, 72, 74, 76. In addition, the limiter 60 is either coupled to the microphone 52 (FIG. 2A) or the cellular circuitry 49 (FIG. 2B) by a connector 78, and the switch 68 is coupled to the antenna 48 by a connector 80. Various elements of the transmitter assembly 44 are also coupled to the control circuit 40. In particular, the modulator 64, the amplifier 66 and the switch 68 are coupled to the control circuit 40 by connectors 82, 84, 86.

In operation, an audio message signal is generated either by the microphone 52 in response to the user speaking into the microphone 52 or by the cellular circuitry 49 in response to receipt of an audio message from the base station 50. Generally, this audio message signal varies in value with time according to the volume or signal value of the audio message spoken by the user or received from the base station 50.

The audio message signal is passed from the microphone 52 or the cellular circuitry 49 through the limiter 60 and the filter 62 to the modulator 64. The limiter 60 and the filter 62 function to shape the audio message signal and remove undesirable noise from the signal prior to modulation. The limiter 60 can, for example, clip unusually large peaks in the audio message signal.

The modulator 64 samples the audio message signal to obtain a plurality of audio samples, each with an instantaneous signal value. The sampling must occur at a rate which is high enough to meet Nyquist's sampling criteria. Preferably, the sampling occurs at a sampling rate of 8 kilosamples per second, or a multiple thereof, for example, 16 kilosamples per second.

The modulator 64 also generates a radio frequency signal which varies in frequency from a predetermined radio frequency in response to variations over time in the value of the audio message signal. That is, the frequency modulated signal varies in frequency dependent on the instantaneous signal values of the message spoken into the microphone 52 by the user or received by the cellular circuitry 49 from the base station 50. Preferably, the modulator 64 operates to generate a continuous frequency modulated (FM) signal.

After passing through the frequency modulator 64, the signal passes through the amplifier 66, wherein the power of the frequency modulated signal is increased. Amplification is desirable given the distances which the audio message signal will have to travel, but preferably should not raise the power of the signal above 100 mW. Keeping the signal below 100 mW is advantageous as the Federal Communications Commission (FCC) does not require licenses for the operation of such low-power radio transmitters.

After amplification, the frequency-modulated audio signal is passed to the switch 68. By opening and closing the switch 68, the frequency modulated audio message signal is divided or formatted into a series of pulses of a finite duration and, preferably, a predetermined repetition rate under the control of the control circuit 40 (S1 and A, FIG. 3). The pulse repetition rate is preferably equal to the speech sampling rate.

Specifically, according to the time-division multiplexing format preferably used by each of the radio-communications devices of the system 20, two time slots each having a duration of 62.5 μs are established (equivalent to a sampling rate of 8 kilosamples/second). One slot is designated for the transmission of information from the radio-communication device to another radio-communication device, and one slot is designated for the reception of information by the radio-communication device from the other radio-communication device. Consequently, there is a predetermined time between the pulses of each of the pulsed message signals communicated between the radio-communication devices. Preferably, the predetermined time is not less than the duration of the time slots, i.e. 62.5 μs.

Each pulse generated by the switch 68 lasts for some fraction of the transmission time slot, and is representative of a symbol (or bit) of a control message to be sent from a radio-communications device to another radio-communication device with which it is communicating. For example, a pulse of 56 μs duration may indicate an on bit (A, slot 4, FIG. 3), while a pulse of 40 μs duration may indicate an off bit (A, slot 2, FIG. 3). The pulsed, frequency-modulated message signal is provided to the antenna 48 for transmission to another of the radio-communication devices.

Preferably, the control circuit 40 controls the amplifier 66 and the switch 68 such that the amplifier 66 and the switch 68 are only energized during the time slots assigned for signal transmission. As a consequence, a savings in battery life and battery size may be achieved.

Turning now to the receiver assembly 46, it will be recognized that the receiver assembly 46 includes a switch 88, a first filter 90, a first amplifier 92, a local oscillator 94, a mixer 96, a second, band pass filter 98, a discriminator 100, a sample-and-hold circuit 102, a third filter 104, and a second amplifier 106. The receiver assembly 46 thus described is exemplary of an analog FM receiver, but is not meant to be limiting. Any implementation of an FM receiver can be used with the present invention.

A first terminal 107, the filter 90, the amplifier 92, the mixer 96, the filter 98, the discriminator 100, the sample-and-hold circuit 102, the filter 104 and the amplifier 106 are coupled in series by connectors 108, 110, 112, 114, 116, 118, 120, 122. Additionally, the local oscillator 94 is coupled to the mixer 96 by a connecter 124. Moreover, a second terminal 125 is coupled to the antenna 48 by a connector 126, and the amplifier 106 is connected either to the speaker 52 (FIG. 2A) or the cellular circuitry 49 (FIG. 2B) by a connector 128.

Furthermore, several signals are passed back and forth between the receiver assembly 46 and the control circuit 40. Specifically, connectors 130, 132, 134, 136 couple the control circuit 40 to the sample-and-hold circuit 102, the discriminator 100, the local oscillator 94, and the switch 88, respectively. On these connectors 130, 132, 134, 136, signals are passed from the control circuit 40 to the sample-and-hold circuit 102, the local oscillator 94, and the switch 88, and from the discriminator 100 to the control circuit 40.

As shown in FIG. 3, the switch 88 is periodically closed such that the switch 88 is closed while the switch 68 is open, and vice versa (S2, FIG. 3). However, unlike the switch 68, which is only closed for a fraction of the time slot assigned for transmission, the switch 86 remains closed for the entire duration of the time slot assigned for reception, selectively coupling the second terminal 125 (coupled to the antenna 48) to the first terminal 107 (coupled to the filter 90). The signal received (B, FIG. 3) is passed on to the filter 90 which acts to remove noise from the signal prior to amplification.

The amplifier 92, the local oscillator 94 and the mixer 96 function to change the frequency of the carrier to an intermediate frequency, preferably 10.7 MHz. With the carrier frequency changed, the signal is passed through the band-pass filter 98 which is set to 10.7 MHz to clean up the signal prior to application to the discriminator 100.

The discriminator 100 is used to demodulate the signal, i.e. to change the signal of varying frequency into a signal of varying amplitude. The discriminator 100 generates an output voltage on the connector 118 which is proportional to the amount of deviation of the input signal from the nominal carrier frequency (10.7 MHz) (C, FIG. 3), which in turn is proportional to the amount of deviation in the signal received by the antenna 48 from the predetermined frequency. The discriminator 100 also generates a signal on the connector 132 which is high if the amplitude of the input signal on the connector 116 is above a predetermined threshold, and is low otherwise (D, FIG. 3). This signal, also referred to as a carrier detect signal, is used by the control circuit 40 to determine the digital values received as a consequence of the amount of time that the carrier detect signal is high and to regenerate the control message sent by the other radio-communication device thereby.

The sample-and-hold circuit 102 receives inputs from the discriminator 100 via the connector 116 and the control circuit 40 via the connector 130. The signal from the control circuit 40 passed via the connector 130 is a sampling signal (E, FIG. 3). That is, when the signal is high, the output of the sample-and-hold circuit 102 tracks the output from the discriminator 100, and when the signal is low, the output of the sample-and-hold circuit 102 is zero, or at some fixed value representing a zero audio signal voltage. The sampling signal is generated shortly after the arrival of a pulse at the receiver assembly 46, allowing time for receiver transient to settle, and is removed shortly before the end of the shortest possible pulse (40 μs). A suitable duration of the sampling signal is thus just less than 40 μs, for example, 35 μs. As a consequence of the foregoing, the audio message sent by the other radio-communication device is regenerated.

The resultant signal from the sample-and-hold circuit 102 is passed to the filter 104, which is preferably a low-pass filter. The filter 104 removes the pulse frequency component of 8 kHz and any components of radio noise demodulated by the discriminator 100 above the maximum audio frequency of 3.4 kHz. The amplifier 106 is used to increase the power of the signal prior to passing the signal to the speaker 54 or the cellular circuitry 49 (and via the cellular circuitry 49 to the base station 50).

In recap, during a communication session, each device in a pair of radio-communication devices, for example headset 22 and cellular phone 34, will perform the steps of generating audio and control messages, sampling the audio message, generating a radio frequency signal based on the signal values obtained through sampling the audio message, formatting the radio frequency signal into a pulsed radio frequency signal, and transmitting the pulsed radio frequency signal to the other radio-communication device in the pair of devices. Simultaneously in accordance with the time-division multiplexing format discussed above, each radio-communication device will be receiving the pulsed radio frequency signals of the other radio-communication device in the pair, determining the time duration and frequency variation of each pulse in the pulsed radio frequency signal received, and regenerating the audio and control messages from the time durations and frequency variations determined. In this fashion, full duplex transmission of control and audio information is achieved.

Figure 4:
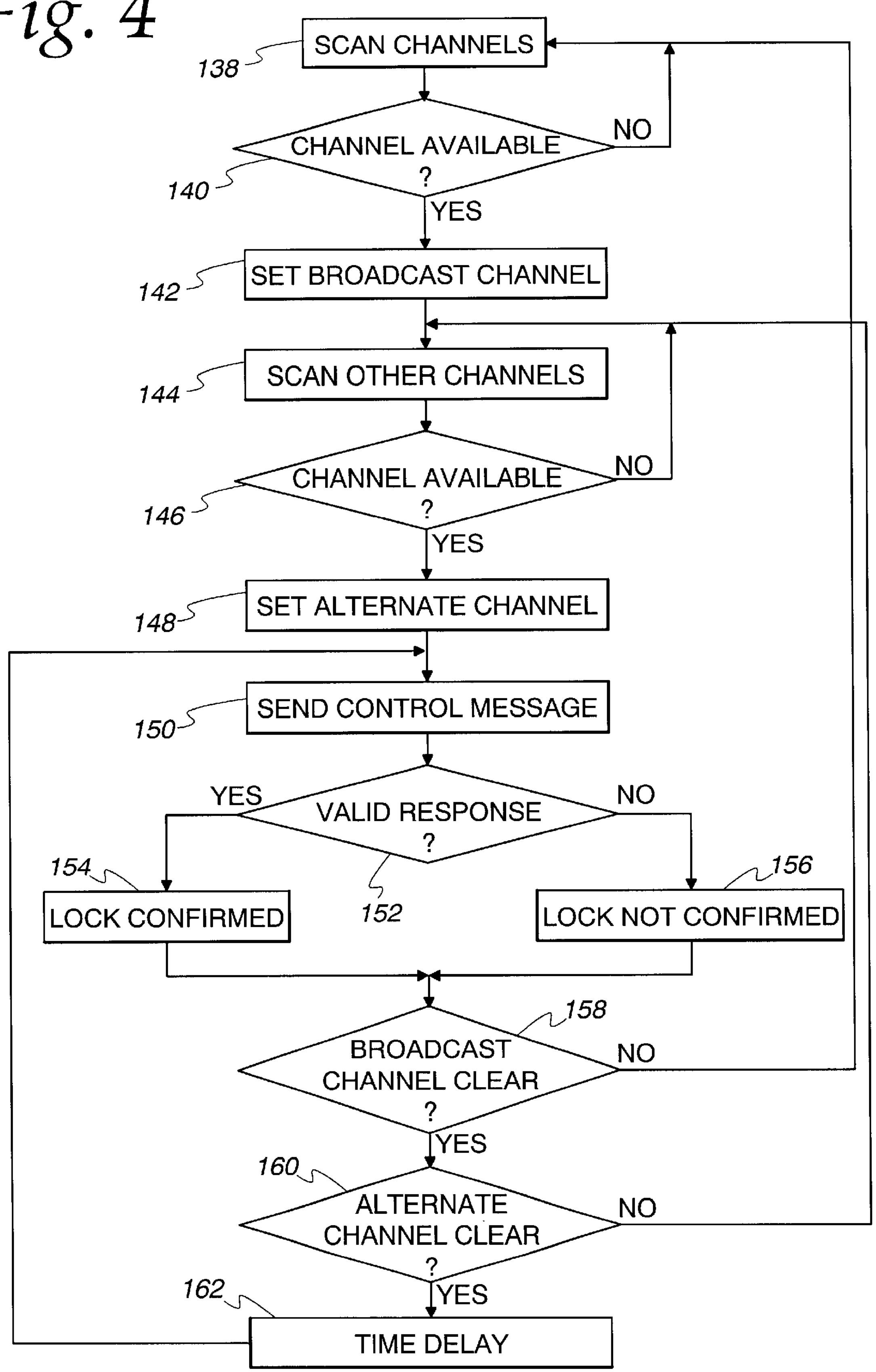
FIG. 4 is a flow chart showing a routine used by a communication-initiating mobile communication device to select two channels on which the mobile radio-communication device can communicate using pulsed, frequency modulated signals with another mobile radio-communication device.
Figure 5:
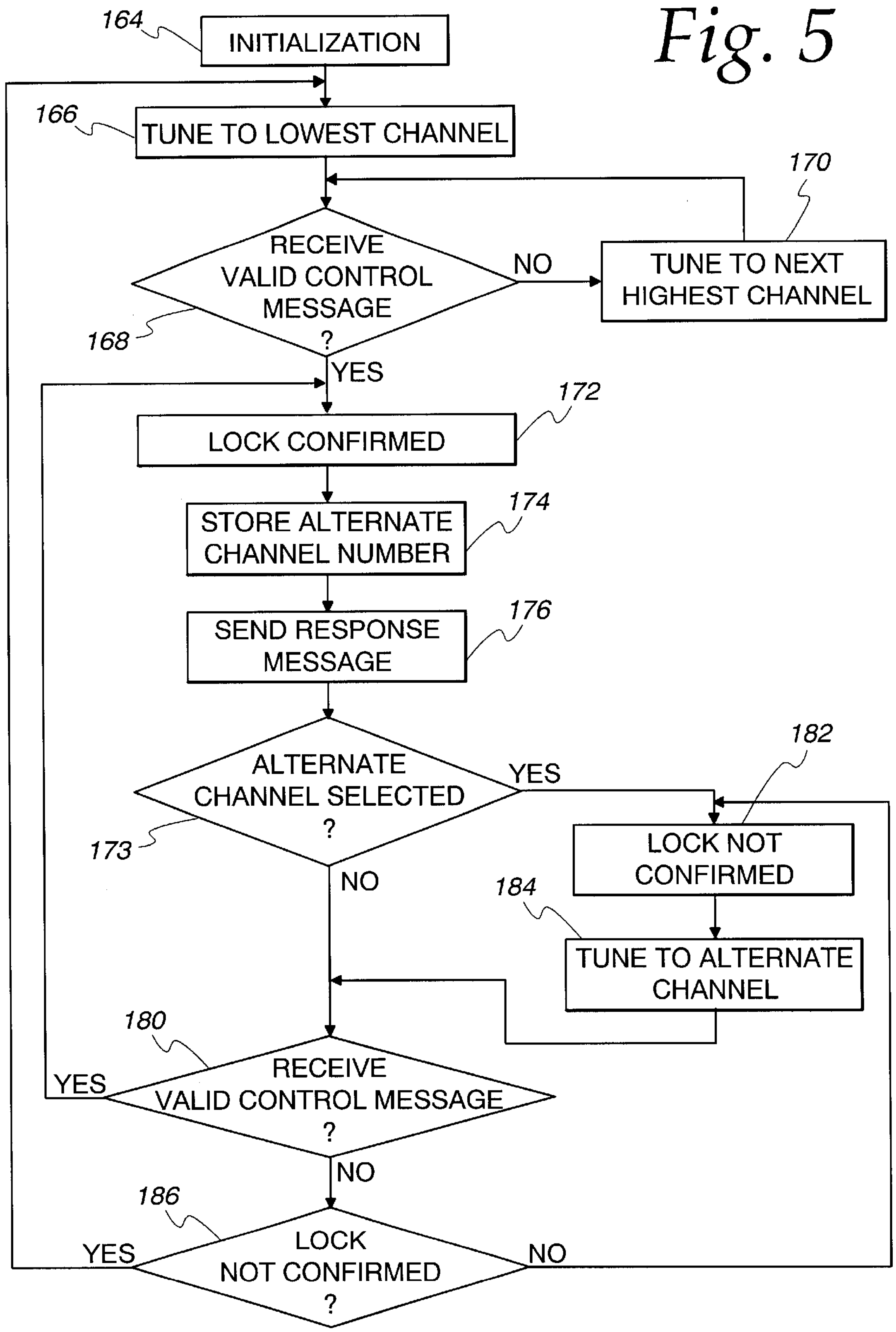
FIG. 5 is a flow chart showing a routine used by a communication-receiving mobile radio-communication device to establish and maintain a control link between the communication-receiving mobile radio-communication and a communication-initiating mobile radio-communication device.
Figure 6:
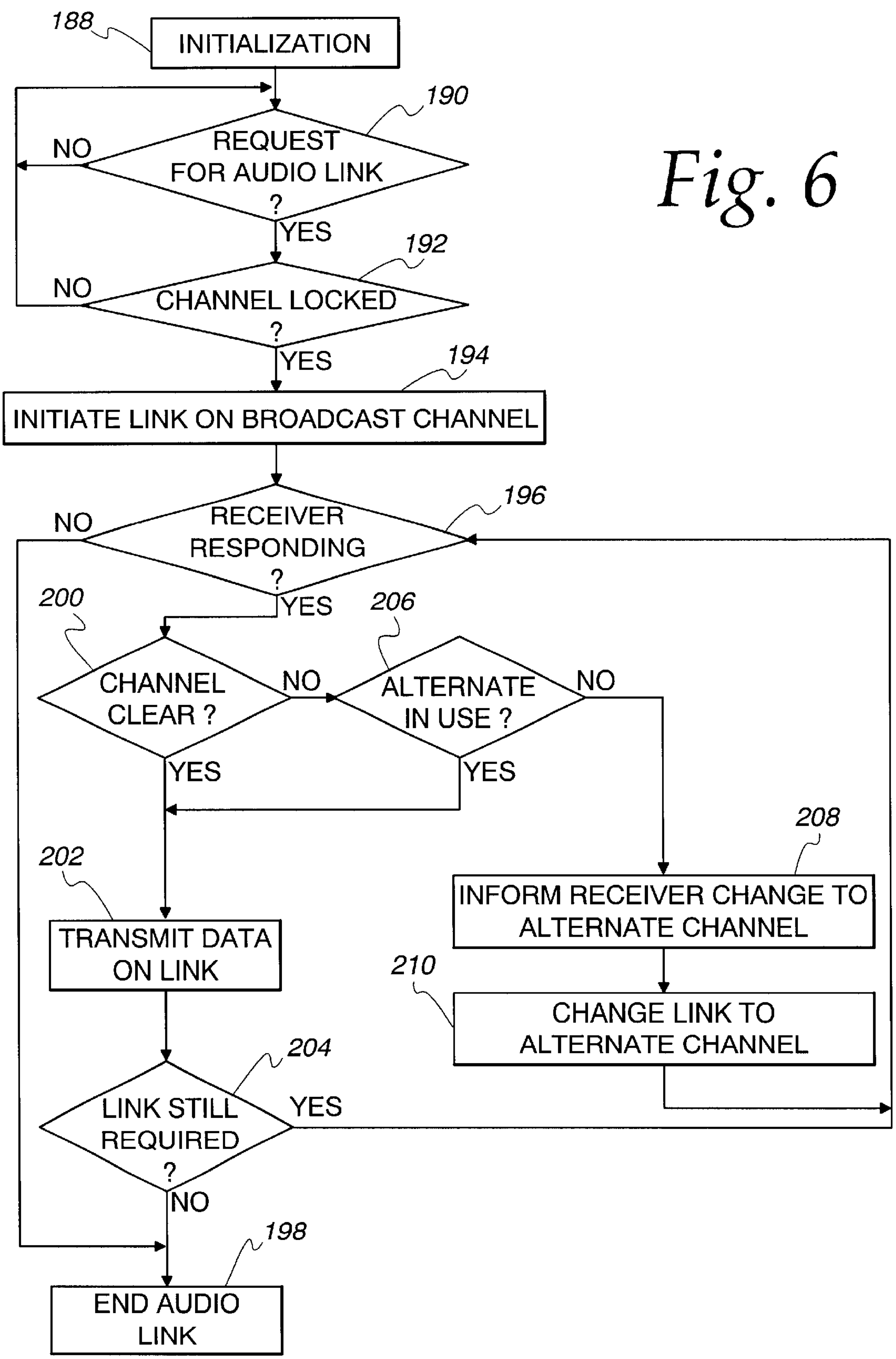
FIG. 6 is a flow chart showing a routine used by a communication-initiating mobile radio-communication device to establish and maintain an audio link between the communication-initiating radio-communication device and a communication-receiving radio-communication device.

In addition to full duplex transmission of control and audio information, the system 20 also operates in such a way that multiple pairs of radio-communication devices can be used in close proximity to each other without significant interference. FIGS. 4–6 illustrate routines performed by the headset/phone pairs to initiate and maintain control and audio links between a communication-initiating device (for example phone 34) and a communication-receiving device (for example headset 22) even in the presence of other radio-communication devices (for example, headsets 24, 26 and phones 36, 38).

FIG. 4 shows a routine used by a communication-initiating radio-communication device, such as the phone 34, to select two channels, a broadcast channel and an alternate channel, for radio-communication with a communication-receiving radio-communication device, for example the headset 22. At a block 138, the control circuit 40 causes the receiver assembly 46 to tune the lowest channel within a predetermined range of channels. Preferably, the range extends from 88–108 MHz (the FM band), and the bandwidth of each channel is on the order of 200 kHz. Because the FCC does not assign adjacent channels in the FM band, there should be at least 100 channels which could be used within this range.

At a block 140, the control circuit 40 determines whether the noise on the channel is below a predetermined threshold limit or level, and thus may be classified as available. Such a determination may be made by sampling the carrier detect signal (D, FIG. 3) after tuning to a specific channel. The predetermined limit or level is preferably set at a level lower than that required to establish communication between the radio-communication devices.

If the channel is not available, the control circuit 40 controls the receiver assembly 46 to tune to the next highest channel within the predetermined range (block 138). The control circuit 40 then repeats the determination step (block 140). This cycle repeats until the receiver assembly 46 tunes into an available channel, or the entire range of channels has been reviewed. If the entire range of channels has been examined, but no available channel has been located, then the control circuit 40 starts again at the lowest channel and repeats through the range until an available channel is located or the user terminates the attempted link.

Assuming that an available channel is located at the block 140, then the control circuit 40 stores the number of the channel under the designation of "broadcast channel" at a block 142. If the user of the radio-communication device attempts to initiate a radio-communication with another radio-communication device, the initial attempt will be made using the channel which has been designated as the broadcast channel.

Having selected a broadcast channel, the control circuit 40 begins at a block 144 a series of steps to locate another channel which will be designated as "alternate channel". The alternate channel is used, as explained in greater detail below, if the broadcast channel becomes unusable because of a decreased signal-to-noise ratio. To locate an alternate channel, the control circuit 40 at the block 144 controls the receiver assembly 46 to tune into the channel just above the channel which had just been set as the broadcast channel.

Similar to the procedure followed above, the control circuit 40 determines at a block 146 whether the next highest channel is available, i.e. has an level of noise that is sufficiently below the predetermined level. Until such a channel is found, the steps at the blocks 146 and 144 are repeated, with the exception that the channel which has been previously designated as the broadcast channel is skipped, because the broadcast channel cannot be set also as the alternate channel. Once an alternate channel is tuned in, the number of the alternate channel is stored by the control circuit 40 at a block 148.

By performing such a search of the channels prior to establishing a link between the communication-initiating device and the communication-receiving device, the system 20 ensures that two headset/phone pairs cannot operate on the same channel, as a second pair which attempted to communicate on the same channel as a first pair would find that the channel is not available (the "noise" caused by the establishment of a link between the first pair being greater than the predetermined limit set on acceptable noise levels). Moreover, it is possible with such a system to vary the channels used between sessions if the interference on a channel previously used to establish a link between two radio-communication devices of the system 20 previously has increased.

Having located a broadcast channel and an alternate channel, the control circuit 40 controls the transmitter assembly 44 to format and transmit a control message via the antenna 48 to another radio-communication device at a block 150. The control message may include such items as a start indicator (a unique sequence of bits indicating the start of a control message packet), an identification code for the radio-communication device with which the device transmitting the control message wants to establish a link, the number of the alternate channel, miscellaneous control data (for example, a low battery indicator message), and an error indicator (a unique sequence of bits indicating the presence of an error in the message).

The control circuit 40 then waits a predetermined period of time for a valid response message to be transmitted back to the radio-communication device from the other radio-communication device at a block 152. The response message may include such information as the identification code of the radio-communication device with which a link is sought.

If a response message is received from the communication-receiving radio-communication device within the predetermined period of time, then at a block 154, the control circuit 40 sets a flag that a control link with the communication-receiving radio communication device has been established (lock-confirmed). Alternatively, if no valid response message is received by the radio-communication device within the predetermined period of time, then the control circuit 40 sets a flag that a control link with the other radio communication device has not been established (lock-not-confirmed).

Having determined whether or not a link can be established, the control circuit 40 controls the receiver assembly 46 to determine if the broadcast channel is still "clear", i.e. has a level of noise thereon below a predetermined value, at a block 158. If a control link has been established, this testing can occur only during those times when no signal is expected from the other device, for example during the 22.5 $\mu$s after the transmission of an off bit. The procedure is repeated for the alternate channel at a block 160.

By testing for channel clarity, the system 20 may be able to determine the onset of an interference pattern on the channel prior to the interference rendering the channel useless. As a consequence, the communication-initiating device can request a transfer of the link to the alternate channel, thereby maintaining an uninterrupted flow of information between the communication-initiating device and the communication-receiving device.

The routine then pauses for a predetermined period of time at a block 162 before repeating the steps of the blocks 150–162. The predetermined period may vary according to the state of the link between devices; the predetermined period may be shorter when control and audio links are established (so as to maintain constant audio transmission) than when only a control link has been established.

If at any point the control circuit 40 determines that the broadcast channel is not clear, then the routine returns to the block 138, whereupon the control circuit 40 begins the search for a new broadcast channel and a new alternate channel. If at any point the control circuit 40 determines that the alternate channel is not clear, then the routine returns to the block 144, whereupon the control circuit 40 begins the search for a new alternate channel.

FIG. 5 shows the steps of a routine executed by a communication-receiving device to establish and maintain a control communication link. At a block 164, the control circuit 40 executes an initialization routine wherein a flag is set equal to lock-not-confirmed. The control circuit 40 then controls the receiver assembly 46 at a block 166 to tune to the lowest channel in a predetermined range. Preferably, the range is between 88–108 MHz, and the bandwidths of the channels is 200 kHz.

The control circuit 40 then determines at a block 168 if a valid control message (a message with that device's identification code) has been broadcast on the channel into which the receiver assembly has been tuned. If no valid control message is being transmitted on the channel the receiver assembly has been tuned into, then the control circuit 40 controls the receiver assembly 46 to tune into the next highest channel at a block 170. If a control message is being transmitted on the channel which the receiver has been tuned into, then the control circuit 40 sets the flag to lock-confirmed at a block 172.

After setting the flag at the block 172, the receiver assembly 46 under the control of the control circuit 40 demodulates the control message and stores the number of the alternate channel communicated thereby at a block 174. The control circuit 40 then controls the transmitter assembly 44 to format a response message which is transmitted back on the channel on which the control message was received (block 176).

The control circuit 40 then determines from the control message whether a request to change to an alternate channel has been made at a block 178. If no request to change the channel has been made, the control circuit 40 determines at a block 180 whether a valid control message is still being received from the other radio-communication device. If the control message is still being received, then the routine returns to the block 172.

If at some point during the maintenance of the communication link between the two radio-communication devices the signal-to-noise ratio of the broadcast channel decreases below a predetermined threshold value, then the communication-initiating device may transmit a change-channel command as part of the control message on the broadcast channel. If this happens, then at the block 178, the control circuit 40 of the communication-receiving device determines that the alternate channel has been selected. At a block 182, the control circuit 40 sets the flag to lock-not-confirmed. The control circuit 40 also controls the receiver assembly 46 to tune into the alternate channel at a block 184.

Either way, the control circuit 40 makes the determination at the block 180 whether a valid control message is being received from the communication-initiating radio communication device. If a valid control message is not being received, and if the lock confirmation flag has been set to lock-not-confirmed at the block 182, the control circuit 40 determines that communication has already been attempted on the alternate channel, and that the routine must return to the block 166 to search for a new channel on which to communicate. If a valid control message is not being received, and if the lock confirmation flag has been set to lock-confirmed at the block 172, then the control circuit 40 performs the steps shown in the blocks 182, 184 to change the channel to the alternate channel. Alternatively, as stated previously, if the control circuit 40 determines at the block 180 that a valid control message is being received from the communication-initiating device on the alternate channel, then the routine returns to the block 172.

FIG. 6 shows a routine for establishing an audio communication link between a communication-initiating device and a communication-receiving device as implemented in the communication-initiating device. The routine begins at a block 180 with the control circuit 40 performing initialization as necessary. The control circuit 40 determines at a block 190 whether a request for an audio link has been made. If the request has not been made, then the control circuit 40 waits at the block 190 until a request has been made.

Once the request has been made, the control circuit 40 determines at a block 192 if a channel has been locked in to the desired communication-receiving device (FIG. 4, blocks 154, 156). If not, then the control circuit 40 repeats the steps shown at the blocks 190, 192 until a lock is confirmed.

With the lock confirmed, the control circuit 40 at a block 194 initiates an audio link on the broadcast channel. The control circuit 40 then determines at a block 196 whether the communication-receiving radio-communication device has provided the proper response message. If not, the routine terminates at the block 198, the control circuit 40 providing a visual or audio indication to the user that the communication link cannot be made.

If the control circuit 40 determines at the block 196 that the communication-receiving device is responding with a valid response message, then at a block 200, the control circuit 40 determines whether the broadcast channel is clear, i.e. has a noise level below a predetermined amount. If the broadcast channel is clear, then the control circuit 40 controls the transmitter assembly 44 to transmit the audio message as described above at a block 202.

The control circuit 40 then determines if the audio communication link is still required at a block 204. If the link is required, then the routine returns to the block 196. If the link is not required, the routine ends at the block 198.

Alternatively, at the block 200, the control circuit 40 may determine that the broadcast channel is no longer clear. If so, then at a block 206 the control circuit 40 determines whether the alternate channel is present being used. If not, then the control circuit 40 sends a change-channel command to the communication-receiving radio-communication device at a block 208 and controls the transmitter assembly 44 to transmit on the new channel at a block 210.

If the alternate channel is already being used, then the routine proceeds to the block 202 to communicate the data on the present channel (which is the alternate channel). Information will continue to be transmitted on the alternate channel until the link with the communication-receiving device is lost, or the link is terminated at the user's request.

Still other aspects, objects, and advantages of the present invention can be obtained from a study of the specification, the drawings, and the appended claims.

We claim:

1. A method of communicating control and audio information between at least two radio-communication devices, the method comprising the steps of:

generating a first control message comprising a plurality of message symbols to be transmitted from a first radio-communications device to a second radio-communications device;

generating a first audio message to be transmitted from the first radio-communications device to the second radio-communications device;

sampling the first audio message to obtain a first plurality of audio samples, each with an instantaneous signal value;

generating a first radio frequency signal which varies in frequency from a first predetermined radio frequency dependent on the instantaneous signal values of the first plurality of samples;

formatting the first radio frequency signal into a first pulsed radio frequency signal, each pulse having a time duration representative of one of the plurality of message symbols of the first control message; and transmitting the first pulsed radio frequency signal from the first radio-communication device to the second radio-communication device.

2. The method according to claim 1, wherein the step of generating a first audio message comprises the step of receiving the first audio message from a cellular base station.

3. The method according to claim 1, further comprising the steps of:

receiving the first pulsed radio frequency signal at the second radio-communication device;

determining the time duration of each pulse of the first pulsed radio frequency signal;

determining the variation in frequency of each pulse of the first pulsed radio-frequency signal from the first predetermined radio frequency;

regenerating the first control message from the determined time durations; and regenerating the first audio message from the determined frequency variations.

4. The method according to claim 3, further comprising the step of transmitting the regenerated first audio message from the second radio-communications device to a cellular base station.

5. The method according to claim 3, further comprising the step of driving a speaker using the regenerated first audio signal.

6. The method according to claim 1, wherein the first pulsed radio frequency signal has a predetermined time between pulses, and further comprising the steps of:

generating a second control message comprising a plurality of message symbols to be transmitted from the second radio-communications device to the first radio-communications device;

generating a second audio message to be transmitted from the second radio-communications device to the first radio-communications device;

sampling the second audio message to obtain a second plurality of audio samples, each with an instantaneous signal value;

generating a second radio frequency signal which varies in frequency from the first predetermined radio frequency dependent on the instantaneous signal values of the second plurality of audio samples;

formatting the second radio frequency signal into a second pulsed radio frequency signal, each pulse having a time duration representative of one of the plurality of message symbols of the second control message; and transmitting the pulses of the second pulsed radio frequency signal from the second radio-communication device to the first communications device during the predetermined time between the pulses of the first pulsed radio frequency signal.

7. The method according to claim 1, further comprising the steps of:

generating a second control message comprising a plurality of message symbols to be transmitted from a third radio-communications device to a fourth radio-communications device;

generating a second audio message to be transmitted from the third radio-communications device to the fourth radio-communications device;

sampling the second audio message to obtain a second plurality of audio samples, each with an instantaneous signal value;

generating a second radio frequency signal which varies in frequency from a second predetermined radio frequency dependent on the instantaneous signal values of the second plurality of samples, the second predetermined radio frequency being different from the first predetermined radio frequency;

formatting the second radio frequency signal into a second pulsed radio frequency signal, each pulse having a time duration representative of one of the plurality of message symbols of the second control message; and transmitting the second pulsed radio frequency signal from the third radio-communication device to the fourth radio-communication device.

8. The method according to claim 1, further comprising the steps of:

tuning in a first radio frequency from a plurality of radio frequencies;

determining the level of noise or interference associated with the first radio frequency; and designating the first radio frequency as the first predetermined radio frequency if the determined level is below a predetermined threshold level.

9. The method according to claim 8, further comprising the steps of:

tuning in another radio frequency from the plurality of radio frequencies other than the first radio frequency if the determined level is above the predetermined threshold level;

determining the level of noise or interference associated with the other radio frequency; and designating the other radio frequency as the first predetermined radio frequency if the determined level associated with the other radio frequency is below the predetermined threshold level.

10. The method according to claim 8, further comprising the steps of:

tuning in a second radio frequency from the plurality of radio frequencies other than the first radio frequency;

determining the level of noise or interference associated with the second radio frequency; and designating the second radio frequency as an alternate predetermined radio frequency if the determined level associated with the second radio frequency is below the predetermined threshold level.

11. The method according to claim 10, further comprising the steps of:

after the step of designating the first predetermined radio frequency, determining if the level of noise or interference associated with the first predetermined radio frequency is below the predetermined threshold level; and designating the alternate predetermined radio frequency as the first predetermined radio frequency if the determined level associated with the previous first predetermined radio frequency is above the predetermined threshold level.

12. A radio-communication system comprising:

first and second radio-communication devices capable of communicating with each other, the first and second radio-communication devices each comprising:

a radio frequency antenna;

a frequency modulator to generate a radio frequency signal which varies from a first predetermined radio frequency dependent on the instantaneous signal value of an audio signal provided thereto; and a first switch coupled to the antenna and the modulator to selectively couple the antenna to the modulator for a predetermined duration, the duration of the coupling of the antenna to the modulator representative of a symbol of a control message to be communicated between the first and second radio-communication devices.

13. The radio-communication system according to claim 12, wherein the first and second radio-communication devices each comprise:

first and second terminals;

a second switch coupled between the first and second terminals, the switch selectively coupling the second terminal to the first terminal for a second predetermined duration which is longer than the first predetermined duration;

the antenna coupled to the first terminal; and a receiver coupled to the second terminal for (a) determining the duration of the radio frequency signal selectively coupled to the second terminal, (b) determining the deviation of the frequency of a radio frequency signal selectively coupled to the second terminal relative to the first predetermined radio frequency, (c) regenerating the audio signal dependent on the determined variation in the frequency of the radio frequency signal selectively coupled to the second terminal relative to the first predetermined radio frequency, and (d) regenerating the control message from the determined radio frequency signal durations.

14. The radio-communication system according to claim 13, wherein the first radio-communications device comprises:

a microphone coupled to the frequency modulator to provide the frequency modulator with the audio signal; and a speaker coupled to the receiver to receive therefrom the regenerated audio signal.

15. The radio-communication system according to claim 14, further including one or more base stations, and wherein the second radio-communications device comprises cellular circuitry means coupled to the frequency modulator for (a) providing the frequency modulator with the audio signal received from one of said one or more base stations and (b) transmitting the regenerated audio signal received from the receiver to one of said one or more base stations.

16. The radio-communication system according to claim 12, wherein the first and second radio-communications devices are mobile radio-communication devices.

17. The radio-communication system according to claim 13, wherein:

the first radio-communications device has a speaker coupled to the receiver to receive therefrom the regenerated audio signal and a microphone coupled to the frequency modulator to provide the frequency modulator of the first radio-communication device with the audio signal, the speaker and the microphone mounted to a headset securable to a head of a user; and the second radio-communications device being a cellular phone.

18. The radio-communication system according to claim 12, further comprising:

third and fourth radio-communication devices capable of communicating with each other, the third and fourth radio-communications devices each comprising:

a radio frequency antenna;

a frequency modulator to generate a radio frequency signal which varies from a second predetermined radio frequency dependent on the instantaneous signal value of an audio signal provided thereto, the second predetermined radio frequency being different from the first predetermined radio frequency; and a first switch coupled to the antenna and the modulator to selectively couple the antenna to the modulator for a predetermined duration, the duration of the coupling of the antenna to the modulator representative of a symbol of a control message to be communicated between the third and fourth radio-communications devices.

* * * * *